US006974110B2

(12) United States Patent
Grandics

(10) Patent No.: US 6,974,110 B2
(45) Date of Patent: Dec. 13, 2005

(54) METHOD AND APPARATUS FOR CONVERTING ELECTROSTATIC POTENTIAL ENERGY

(76) Inventor: Peter Grandics, 5922 Farnsworth Ct., Carlsbad, CA (US) 90720

( * ) Notice: Subject to any disclaimer, the term of this patent is extended or adjusted under 35 U.S.C. 154(b) by 74 days.

(21) Appl. No.: 10/331,007

(22) Filed: Dec. 27, 2002

(65) Prior Publication Data

US 2004/0011925 A1 Jan. 22, 2004

Related U.S. Application Data

(63) Continuation-in-part of application No. 09/732,110, filed on Dec. 7, 2000, now abandoned.
(60) Provisional application No. 60/169,378, filed on Dec. 7, 1999.

(51) Int. Cl.[7] ................................................ F03H 5/00
(52) U.S. Cl. .......................................... 244/172; 244/62
(58) Field of Search ............................ 244/172, 158 R, 244/169, 62, 53 R, 51

(56) References Cited

U.S. PATENT DOCUMENTS

| 3,013,201 A | 12/1961 | Goldie |
| 4,127,804 A | 11/1978 | Breaux |
| 4,151,409 A | 4/1979 | O'Hare |
| 4,595,852 A | 6/1986 | Gundlach |
| 5,052,638 A | 10/1991 | Minovitch |
| 5,305,974 A | 4/1994 | Willis |
| 5,813,217 A | 9/1998 | Beall |
| 5,947,421 A | 9/1999 | Beattie et al. |
| 5,966,986 A | 10/1999 | Laul |
| 6,089,511 A | 7/2000 | Rasmusson |
| 6,193,194 B1 | 2/2001 | Minovitch |

OTHER PUBLICATIONS

DC Circuits vol. II, Circuit Analysis Methods, 1979.*
Engineering Circuit Analysis, Third Edition, 1978.*
R.V. Anderson, in *Electrical Processes in Atmospheres*, (H. Holezalek & R. Reiter, eds, Steinkopff, Darmstadt, 1977), pp. 87–99.
R.G. Roble & I. Tzur, in *The Earth's Electrical Environment, Studies in Geophysics* (National Academy Press, Washington, D.C. 1986), pp. 206–231.
R.P. Feynman, *Lectures on Physics* (Addison–Wesley, Inc., Palo Alto, California, 1964), v.2, ch. 9, pp. 1–11.
W. Gringel, J.M. Rosen, & D.I. Hofmann, in *The Earth's Electrical Environment, Studies in Geophysics* (National Academy Press, Washington, D.C. 1986), pp. 166–182.
R.H. Holzworth et al., "Direct Measurement of Lower Atmospheric Vertical Potential Differences," *Geophys. Res. Lett.* 8: 783–786 (1981).
R.H. Holzworth, "Hy–wire Measurement of Atmospheric Potential," *J. Geophys. Res.* 89: 1395–1401 (1984).
R.E. Orville, in *The Earth's Electrical Environment, Studies in Geophysics* (National Academy Press, Washington, D.C. 1986), pp. 23–29.
R.B. Standler & W.P. Winn, "Effects of Coronae on Electrid Fields Beneath Thunderstorms," *Quart. J.R. Met. Soc.* 105: 285–302 (1979).

* cited by examiner

Primary Examiner—Peter M. Poon
Assistant Examiner—Timothy D. Collins
(74) Attorney, Agent, or Firm—Catalyst Law Group, APC; Michael B. Faber, Esq.

(57) ABSTRACT

A new method is described to produce useful electrical energy from DC electrostatic fields using a pyramid-shaped capacitor. The system uses no moving parts and no mechanical energy is introduced. Also, when a pyramid-shaped electrode is charged with DC high voltage, a propulsive force is generated. This will allow the manufacture of vehicles capable of levitation and flight.

13 Claims, 3 Drawing Sheets

METHOD AND APPARATUS FOR CONVERTING ELECTROSTATIC POTENTIAL ENERGY

CROSS-REFERENCES

This application is a continuation-in-part of application Ser. No. 09/732,110, filed Dec. 7, 2000, now abandoned, entitled "Method and Apparatus for Converting Electrostatic Potential Energy," by Peter Grandics, which claims the benefit of Provisional application Ser. No. 60/169,378, filed Dec. 7, 1999, which is incorporated herein in its entirety by this reference.

BACKGROUND OF THE INVENTION

This invention relates to the generation of electrical power by drawing energy from an electrostatic potential field. The conversion of DC electrostatic energy into useable electrical energy by electrostatic generators is already described in the prior art as disclosed in U.S. Pat. Nos. 3,013,201, 4,127,804, 4,151,409 and 4,595,852. Generally, such prior art electrostatic generators utilize mechanical energy to separate charges and thus contain complex mechanics that is difficult to scale up for a high output system. Therefore, the present invention aims to provide an electrostatic generator in which electrical power is derived exclusively from the energy of DC electrostatic fields without the input of mechanical power.

SUMMARY OF THE INVENTION

Pursuant to this invention a simple technique is described to convert the energy of a DC electrostatic field into an alternating current by wrapping a coil around the pyramid. The resulting AC current can be rectified and used for practical purposes. A pyramid-shaped capacitor can also be used in an inverse mode of operation for the generation of propulsive force.

Accordingly, one embodiment of the present invention is a method for converting DC electrostatic energy into usable electrical energy, the method comprising the steps of:

(1) providing a capacitor of pyramidal shape;

(2) placing an insulated coil on the surface of the capacitor, the coil having leads;

(3) attaching a rectifier to the leads of the coil, the rectifier having leads; and (4) attaching a capacitor or a battery to the leads of the rectifier so that DC electrostatic energy is converted into usable electrical energy.

Another embodiment of the present invention comprises a method for converting DC electrostatic energy into propulsive force comprising the steps of:

(1) providing a first capacitor of pyramidal shape;

(2) placing an insulated conductive tip on the point of the capacitor;

(3) providing a static generator for charging the capacitor, and (4) attaching 3 ball-shaped smaller capacitors to the bottom of the pyramidal-shaped capacitor; and (5) providing means to extend or retract the ball-shaped capacitors from the pyramidal-shaped capacitor, so DC electrostatic energy is converted into propulsive force by the action of the first capacitor and the 3 ball-shaped smaller capacitors provide directional control.

BRIEF DESCRIPTION OF THE DRAWINGS

The following invention will become better understood with reference to the specification, appended claims, and accompanying drawings, where:

DESCRIPTION OF THE PREFERRED EMBODIMENT

Pursuant to this invention, a novel method is described to convert DC electrostatic energy into an AC current that can be rectified and used for practical purposes. The shape of the capacitor and the body of such device is designed to convert the DC electrostatic energy into the AC current for maximal effect.

Figure 1:
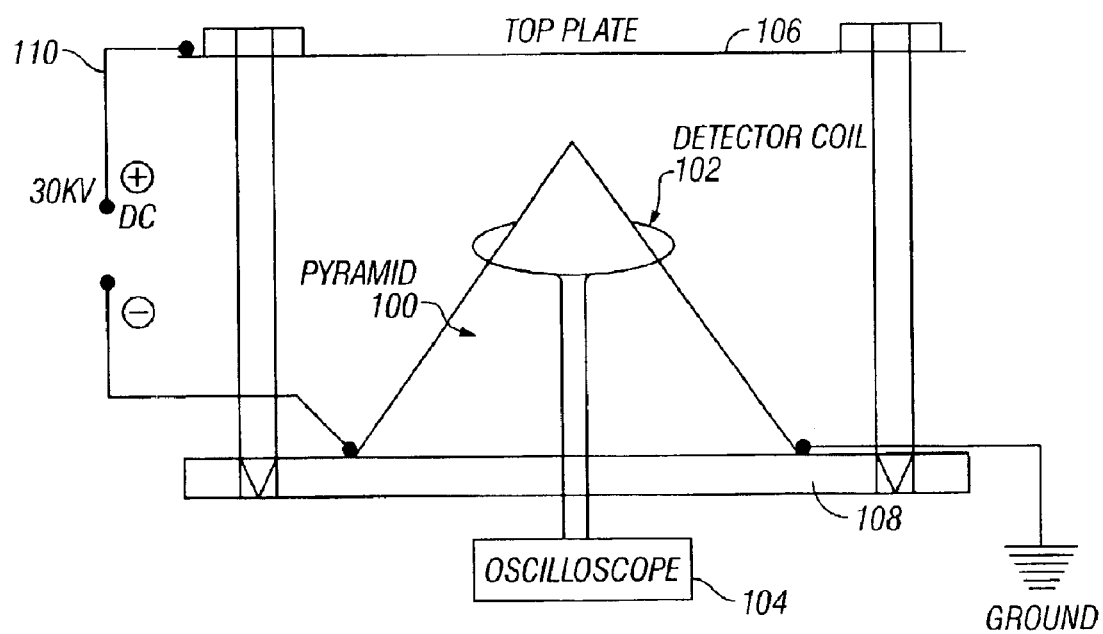
FIG. 1 is a diagram demonstrating the pyramid experimental setup.
Figure 2:
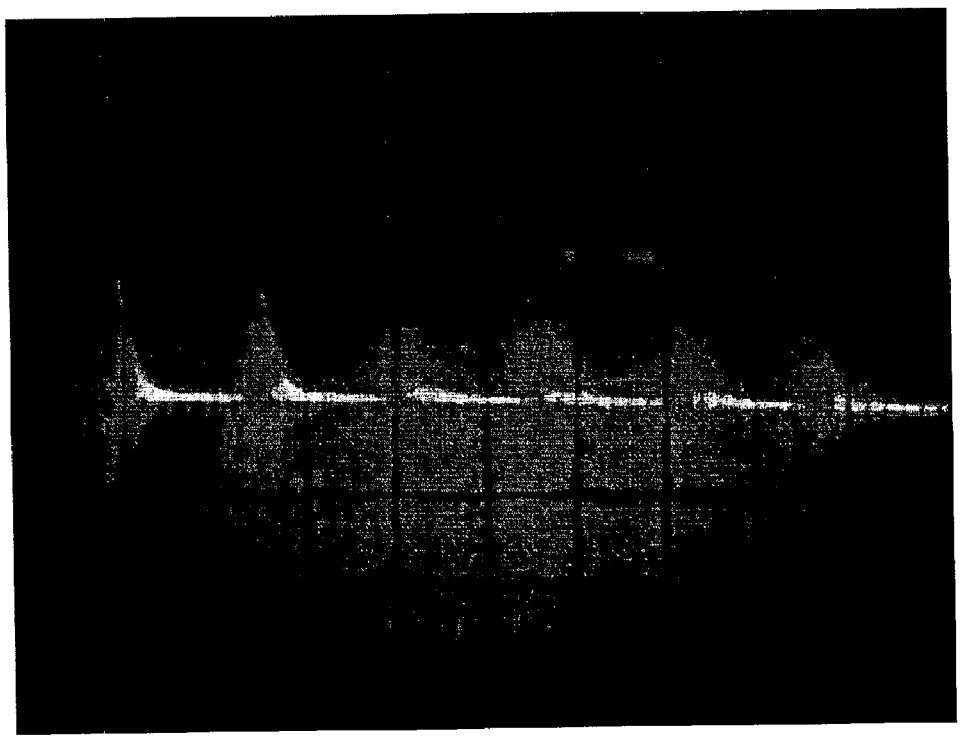
FIG. 2 is the pyramid coil signal as detected by oscilloscope.

A pyramidal or conical shape is preferred for one of the capacitor electrodes (FIG. 1). In FIG. 1, a detector coil 102 is provided that is in turn connected to an oscilloscope 104. The coil surrounds the metallic pyramid 100. In the experimental setup shown, the field is established between a top plate 106 and the pyramid 100 by using a ground 108 connected to a source of DC electrical energy 110. When a high voltage DC field (30 kV) is established on such capacitor, a regularly repeating, clocklike signal is detected in the coil placed on the pyramid's surface (FIG. 2). This is an unexpected observation as corona discharges are irregular by nature.

The alternating current from the coil can be rectified and used for practical purposes. If a suitable DC electrostatic field could be found in nature, this principle would be useful in tapping the energy of such field. To test for this possibility, I have measured the rectified signal from the coil without an external power source. The rectified coil output was collected in a capacitor and voltage measured in 1 h intervals. The voltage measured is significantly higher if the capacitor electrode is pyramid-shaped as opposed to a box-shaped electrode of the same height and volume. When the pyramid is placed into a Faraday cage, the signal is abolished (see details in the Example). The data has demonstrated in principle that with this experimental setup electrical energy can be extracted from the Earth's electrostatic field. The Earth's surface and the ionosphere substitutes for the two charged electrodes, which exhibit negative and positive polarities, respectively.

Atmospheric electricity manifests as a buildup of electrostatic energy, a phenomenon that permanently electrifies our environment (Anderson, R. V. in Electrical Processes in Atmospheres, H. Holezalek and R. Reiter, eds., (Steinkopff, Darmstadt, 1977) pp. 87–99). The voltage gradient between the Earth's surface and the ionosphere is thought to be maintained by the electrical activity of the troposphere as well as the solar wind-coupled magnetospheric dynamo (Roble, R. G. Tzur, I. in The Earth's Electrical Environment, Studies in Geophysics (National Academy Press, Washington D.C., 1986) pp. 206–231). The Earth's electrostatic field is never depleted, despite the constant discharges of energy. There are two segments of atmospheric electrical processes that potentially could be tapped, fair weather and thunderstorm related atmospheric electrical phenomena.

The Earth's voltage field creates a potential difference of about 400,000 V (Feynman, R. P. Lectures on Physics (Addison Wesley, Inc., Palo Alto, Calif., 1964) v.2, Chapter 9), with a voltage gradient of about 200–300 V/m around the surface of the Earth (W. Gringell, J. M. Rosen, D. I. Hofmann, in The Earth's Electrical Environment, Studies in Geophysics (National Academy Press, Washington D.C., 1986) pp. 166–182). Given this voltage drop of 200–300 V/m, the desired 30 kV potential can be obtained at a pyramid height of about 100–150 m.

Due to the evolving nature of our understanding of atmospheric electrical processes, we do not have a clear picture of the magnitude of electrical energy generated (and dissipated) in the global atmospheric electrical circuit by localized convective phenomena. Direct measurement of the atmospheric vertical potential difference using tethered balloons have shown that under fair weather conditions and at low altitudes (150–550 m), short circuit currents on the order of 10 μA were obtained with a single wire collector yielding a power of about 1 W (Holzworth, R. H. et al., Direct measurement of lower atmospheric vertical potential differences, Geophys. Res. Lett. 8, 783–786 (1981), and Holzworth, R. H. Hy-wire measurement of atmospheric potential, J. Geophys. Res. 89, 1395–1401 (1984)).

These data remarkably demonstrated that it is possible to couple to a large portion of the atmosphere and also gave an indirect proof of the presence of a fair weather convective generation process. Since at a low altitude of 1500 m, the entire atmospheric vertical electric potential (400 kV) could be bridged, it may even be possible to couple right into ionospheric electrical processes (Holzworth, R. H. et al., Direct measurement of lower atmospheric vertical potential differences, Geophys. Res. Lett. 8,783–786 (1981)). This would significantly expand the available energy pool for this device.

The other possibility is to tap localized peaks of atmospheric electrical activity arising from thunderstorm activity. The approximate order of magnitude of electrostatic energy generated in the troposphere could be estimated by the amount of energy dissipated by lightning discharges. The estimates for the total number of lightning strikes over the entire surface of the Earth vary from 100 to 300 per second (Orville, R. E. in The Earth's Electrical Environment, Studies in Geophysics (National Academy Press. Washington D.C., 1986) pp. 23–29). The estimate for the power discharged in an average lightning event is $10^{12}$ watts over a time period of about 0.2 sec (Christian, H. J. and McCook, M. A. in A lightning primer at http://thunder.msfc.nasa.gov/). This yields a total of 2–6×$10^{13}$ W-sec of electrical energy spent by lightning discharges globally in each second, or approximately 4×$10^{17}$ W-h per year. Over 90% of all lightning occur over landmasses. The distribution of tropospheric electrical activity is highly concentrated, the major production zones being Central Africa, the south central United States and the Amazon Basin (Miller, T. L. Global lighting activity at http://www.ghcc.msfc.nasa.gov/rotating/otd_oval_full.html). This suggests that the density of atmospheric electrical activity in these zones may be high enough to tap.

The current annual global electricity production by the world's power generating industry is 1,22×$10^{16}$ W-h (Seth, A. Nuclear power and its role in global electricity and energy, Institute for Energy and Environmental Research, at http://www.ieer.org/ensec/no-1/glbnrg.html (1997)) which is only a small fraction, about ⅟₃₀th, of the electricity generated and discharged naturally by lightning activity. As lightning represents only peak charge density events, the localized total charge production of thunderstorms is necessarily underestimated by a factor, the magnitude of which is still unknown.

These indicate that atmospheric electricity, if harnessed, could meet all the energy needs of mankind. This invention describes a new electrical phenomenon that allows the conversion of electrostatic energy into an alternating current.

Research on the average electrical power generated and dissipated by the Earth's global electrical circuit suggests that about 2000 thunderstorms are in progress at any given time, and that the average storm current delivered to the ionosphere is of the order of one ampere (Roble, R. G. Tzur, I. in The Earth's Electrical Environment, Studies in Geophysics (National Academy Press, Washington D.C., 1986) pp. 206–231). The potential difference between the Earth and the ionosphere is of the order of 500 kV; therefore, the total source power is of the order 2000×1×5×$10^5$, or $10_9$ watts over the entire planet. Thunderstorms produce an average of one to several nanoamperes per square meter at the surface (Standler, R. B. and Winn, W. P. Quart. J. Met. Soc. 105 285 (1979)). These estimates would suggest that there might not be sufficient energy to tap.

However, the limitation of these low, average Earth surface current densities is not applicable to the pyramid collector for several reasons. In thunderstorms, terawatts of electrical power are generated over relatively long periods of time. To capture this electric power and prevent its dissipation, an effective "charge sink" is necessary. The sub-optimal geometry of the Earth's surface terrain and its relatively low conductivity produce an ineffective sink which leads to small ground surface current densities. A metal pyramid, however, due to its optimal geometry and construction acts as an effective charge sink.

Figure 3:
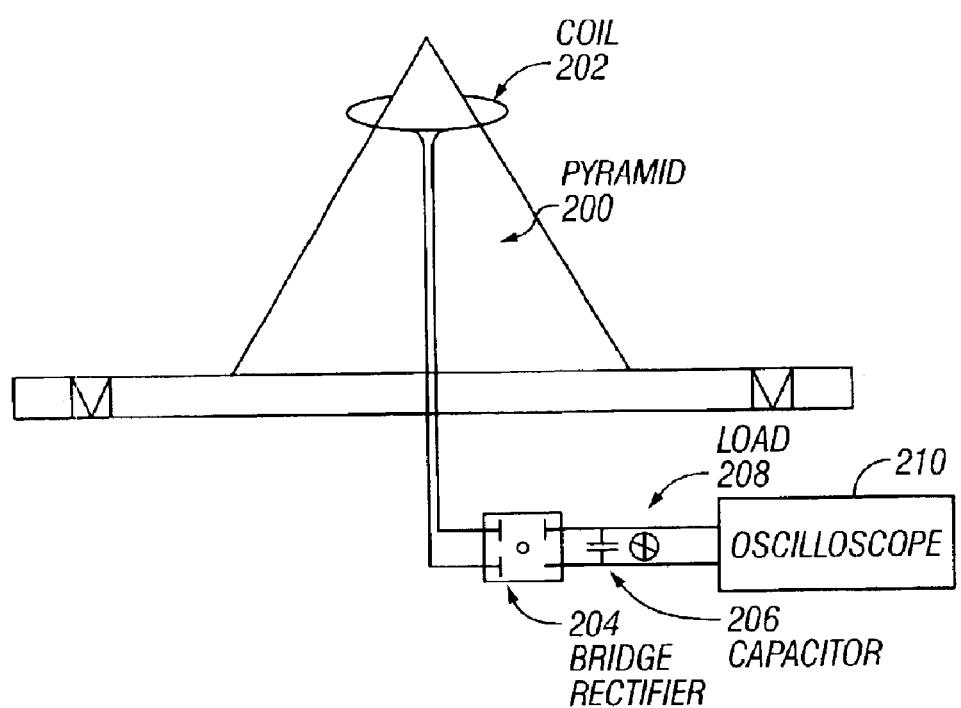
FIG. 3 is a diagram demonstrating power transmission on the pyramid setup.

FIG. 3 shows power transmission on the pyramid setup. In FIG. 3, a pyramid 200 as described above is in contact with a coil 202 and a bridge rectifier 204. The latter is charging capacitor 206 which feeds load 208. Oscilloscope 210 measures the voltage drop on the load.

Accordingly, one embodiment of the invention is a method for converting DC electrostatic energy into usable electrical energy, the method comprising the steps of:

(1) providing a capacitor of pyramidal shape;
(2) placing an insulated coil on the surface of the capacitor, the coil having leads;
(3) attaching a rectifier to the leads of the coil, the rectifier having leads; and
(4) attaching a capacitor or a battery to the leads of the rectifier so that DC electrostatic energy is converted into usable electrical energy.

As detailed below, typically, a clock-like signal is detected from the leads of the coil. The signal can be rectified, pooled in a capacitor, or pooled in a battery.

A production pyramid, with a projected 40,000 m² base surface area, a height of 150 m, and a metallic composition would provide a far more effective charge sink than the surrounding ground surface. As current always flows in the direction of least resistance, this would lead to a concentrated flow of current from the thunderclouds into the pyramid. As a result, a column of air above the surface of the pyramid would become highly ionized and much more conductive than the air in the surrounding area. This would ensure a rapid transfer of charges from the thunderclouds into the pyramid. Therefore, the current flowing into the pyramid would likely be very strong. As a result, lightning activity could be reduced or abolished. In addition, since the threshold effect causes exponential power amplification, such a pyramid could produce very large quantities of electrical energy.

The generation of thunderstorm-related electrical energy in the atmosphere shows a high degree of concentration into three major geographical zones (Miller, T. L. Global lightning activity at http://www.ghcc.msfc.nasa.gov/rotating/otd_oval_full.html). By placing energy-producing pyramids into these zones of high-energy electrical activity, vast quantities of electricity could be obtained. Atmospheric electricity would be a renewable, clean energy source, and could give us the opportunity to begin reversing the process of global warming caused by anthropogenic greenhouse gas emissions. This process, which now produces well-measurable results, threatens to upset our ecosystem with unpredictable consequences (Kerr, R. A. Science 286 1828 (1999)).

Electrostatic energy could also be used to produce a propulsive force. A capacitor made into the shape of a pyramid or cone is suitable. The conductive elements of the capacitor are layered into the pyramidal or conical segment of the hull of such craft. Optimally, there should be several layers of negatively charged conductors on the outside while a single layer of positively charged conductor is in the inside of the craft. All conductive elements should be carefully insulated in order to maintain the charges inside the capacitor.

In the center of the craft, a conductive, insulated pole is mounted such that the pole extends out into the exterior at the top of the craft. The tip of that pole has a metal ball mounted on which is also positively charged. When all capacitor plates are charged, a pressure differential is induced and above the craft the pressure will be higher than at the bottom of the craft. This pressure differential is unstable and progresses towards an equilibrium. It will propel the craft forward in order to eliminate the pressure gradient. This requires that a sufficiently high voltage (>100,000 V) be applied. The capacitors incorporated into the hull will give control over the lift.

To obtain directional control over all three axes of movement, three capacitors need to be mounted at the bottom of the craft placed 120° apart from each other. These capacitors could take the shape of a ball and would be mounted on retractable shafts. The top half of the capacitors would be positively charged while the bottom half is negatively charged. When in flight, the capacitors are retracted and charged based on the needs of directional control so that the ball-shaped capacitors provide lateral movement control for the vehicle. To achieve forward movement, the charges on one capacitor facing the direction of the desired path should be reduced relative to the other two capacitors. This would make the craft tilt forward and start moving in that direction. An alternative method of lateral directional control could be obtained by dividing the capacitor bank inside the hull into segments which segments would be charged individually.

Upon landing, the three ball capacitors would be protracted on their shafts and serve as landing gear. On landing, they would be discharged because the earth is the greater ground. On launching, the main capacitors of the hull would be activated leading to takeoff. The three-capacitor landing gear would then be retracted and charged up so that they can function for lateral directional control after takeoff. On-board static generators would supply voltage required for the operation of the craft.

Accordingly, another embodiment of the invention comprises a method for converting DC electrostatic energy into propulsive force comprising the steps of:

(1) providing a first capacitor of pyramidal shape;

(2) placing an insulated conductive tip on the point of the capacitor;

(3) providing a static generator for charging the capacitor, and (4) attaching 3 ball-shaped smaller capacitors to the bottom of the pyramidal-shaped capacitor; and (5) providing means to extend or retract the ball-shaped capacitors from the pyramidal-shaped capacitor, so DC electrostatic energy is converted into propulsive force by the action of the first capacitor and the 3 ball-shaped smaller capacitors provide directional control.

Inertial forces pose great obstacles to improving the performance of current propulsion systems. The most significant aspect of this type of propulsion would be the loss of inertia during acceleration. The passengers of such craft would feel no forces acting upon their bodies even if the craft achieved enormous accelerations.

This overall design is suitable for the development of a wide range of transportation vehicles, from automobile-type to aircraft and potentially to spacecraft. With such technology, we could eliminate a major factor in environmental pollution which place a great stress on our ecosystem. In the United States, transportation vehicles produce 66% of the greenhouse gases.

The subject invention offers a solution by providing a renewable, non-polluting electricity generation method as well as an electricity-based transportation method capable of levitation and flight.

The following Example illustrates the features and advantages of the subject invention. Accordingly, it is to be understood that the description in this disclosure is to facilitate comprehension of the invention and should not be construed to limit the scope thereof as persons skilled in the art can, in light of this disclosure, generate additional embodiments without exceeding the scope or departing from the spirit of the claimed invention.

EXAMPLE 1

Demonstration of the pyramid generator: For the experiments, I have selected a one-foot base length foam pyramid from a pyramid vendor (The Pyramid Project, Ft. Wayne, Ind.). The outside of the pyramid was covered with aluminum foil. The pyramid was placed on a 2'×2'insulating polyethylene platform equipped with an adjustable height 2'×2'size aluminum top plate, $\frac{1}{16}$" thick. The height of the aluminum plate was adjusted as needed and a gap of $1\frac{1}{4}$" between the plate and the tip of the pyramid was used in the experiments. In some experiments, an aluminum pyramid was used with a wall thickness of $\frac{1}{16}$".

A high voltage (HV) CRT power source producing 30 kV DC was taken from a color monitor. I have assumed that an actual energy-producing pyramid should be relatively high in order to obtain a large voltage drop from its tip to the ground. Therefore, assuming a height of 100–150 m for a life-size pyramid and a voltage drop of 200–300 V/m near the surface of the Earth, the 30 kV is in the range of the voltage-drop expected for the height of a life size pyramid.

The positive pole was attached to the top aluminum plate. This simulated the positive charge of the atmosphere. One corner of the pyramid was attached to the negative pole of the high voltage power source, while the opposite corner of the pyramid was grounded. This setup served as a model for the electrostatic field distribution around a potential life-sized pyramid. As controls, either a 1'×1' sheet of aluminum foil or an aluminum foil-covered box, having the main dimensions of the test pyramid (1'×1'×7 $\frac{5}{8}$"), was used as a negative pole. The detector coils were made by winding up a 24 gauge enamel-coated magnet wire (20 turns, approximately 8 cm in diameter). A Tektronix high-frequency oscilloscope, Model no. 2236 was used for signal acquisition and analysis.

The first sets of experiments were control measurements with a box of the same height and base length as the test pyramid. The detector coil was placed on the top of the box. Measurements were taken with or without the high voltage applied. One corner of the box was attached to the HV power source (negative pole) and the opposite corner to the ground.

The same arrangement was used for the flat square (1'×1') foil. The peak-to-peak signal amplitude for the box was 8 mV and the signal frequency was 2 MHz. For the flat foil sheet, the signal amplitude was 12 mV with a frequency of 1.43 MHz. The signal form was of a decaying sine wave.

When high voltage was applied to these shapes, signal amplitude of 14 mV was obtained for the flat sheet and of 16 mV for the box. The signal frequency was 1.54 MHz for the flat sheet and 2 MHz for the box. The waveforms were of decaying sine waves in all these experiments.

When the pyramid was tested without HV, the peak-to-peak signal amplitude was measured at 60 mV with a frequency of 2 MHz. When the high voltage was applied, the signal amplitude increased up to 180–200 mV, while the frequency remained at 2 MHz. The pyramid produced signal intensity significantly higher than the controls. The signal is regularly repeating, clock-like in nature (FIG. 2). When a metal (aluminum) pyramid of the same size (wall thickness 1/16" inch) was tested in the same high voltage field using the same detection coil, a voltage of 1–1.5 V was detected at the frequency of 2 MHz.

To collect energy from the coil, a bridge rectifier (1000 V peak voltage at 6 A) was attached to the leads of the coil. The rectified current was fed into a capacitor (1500 $\mu$F, 250 V DC max.), and a direct current of 45 V was obtained. This has demonstrated a simple method to convert electrostatic energy into a continuous direct current. An 8-turn coil having an output of 200–300 V AC (peak-to-peak) was also used for energy conversion. The rectified current from the 8-turn coil powered a 0.186 W light bulb (FIG. 3). The bridge rectifier is optimally made of fast-recovery diodes.

Even in the absence of an externally applied voltage, current is always present in the circuit. Charge builds up in the capacitor and 1 V was obtained overnight using the 20-turn coil setup. Over 48 h, a voltage of 5 V was measured. Faraday shielding practically abolished the phenomenon.

The preferred shape of the pyramid as a charge collector was again demonstrated in further experiments using the 8-turn coil-bridge rectifier-capacitor (1,500 $\mu$F) assembly placed on the 1 ft base length aluminum pyramid. A same volume and height aluminum box was used as control. Charging times of 1–2 h were used under fair weather conditions. For the pyramid, 550 mV was measured on the capacitor while on the box 100 mV was obtained. This demonstrated the superiority of the pyramidal shape in capturing atmospheric electrostatic energy. It also demonstrated that we could tap into the electrostatic field of the atmosphere and draw electric energy. For the collection of energy, a battery could substitute for the capacitor.

I claim:

1. A method for converting DC electrostatic energy into usable electrical energy, the method comprising the steps of:
   (a) providing a first capacitor of pyramidal shape, the first capacitor capable of being charged by and storing DC electrostatic energy;
   (b) placing an insulated coil on the surface of the first capacitor, the coil having leads;
   (c) attaching a rectifier to the leads of the coil, the rectifier having leads; and
   (d) attaching a second capacitor or battery to the leads of the rectifier so that DC electrostatic energy stored by the capacitor of pyramidal shape is converted into usable electric energy.

2. The method of claim 1 wherein a clock-like signal is detected from the leads of the coil.

3. The method of claim 1 wherein the signal is rectified.

4. The method of claim 1 wherein the signal is pooled in the second capacitor.

5. The method of claim 1 wherein the rectified signal is pooled in the battery.

6. A method for converting DC electrostatic energy into propulsive force comprising the steps of:
   (a) providing a first capacitor of pyramidal shape, the first capacitor capable of being charged by and storing DC electrostatic energy;
   (b) placing an insulated conductive tip on the point of the first capacitor;
   (c) providing a static generator for charging the first capacitor;
   (d) attaching 3 ball-shaped smaller second, third, and fourth capacitors to the bottom of the pyramidal-shaped first capacitor; and
   (e) providing means to extend or retract the ball-shaped second, third, and fourth capacitors from the pyramidal-shaped first capacitor, so DC electrostatic energy stored by the first capacitor of pyramidal shape is converted into propulsive force by the action of the first capacitor and the 3 ball-shaped smaller second, third, and fourth capacitors provide directional control.

7. The method of claim 6 wherein the energy stored in the pyramidal first capacitor is used for the propulsion of a vehicle.

8. The method of claim 6 wherein the pyramidal first capacitor is negatively charged.

9. The method of claim 6 wherein the insulated conductive tip placed on the point of the pyramidal first capacitor is positively charged.

10. The method of claim 6 wherein the ball-shaped second, third, and fourth capacitors provide lateral movement control for the vehicle.

11. The method of claim 6 wherein the ball-shaped second, third, and fourth capacitors serve as landing pods.

12. The method of claim 6 wherein the ball-shaped second, third, and fourth capacitors are retracted after take-off.

13. The method of claim 10 wherein the ball-shaped second, third, and fourth capacitors are charged for lateral directional control after takeoff.

* * * * *